Patented Feb. 28, 1928.

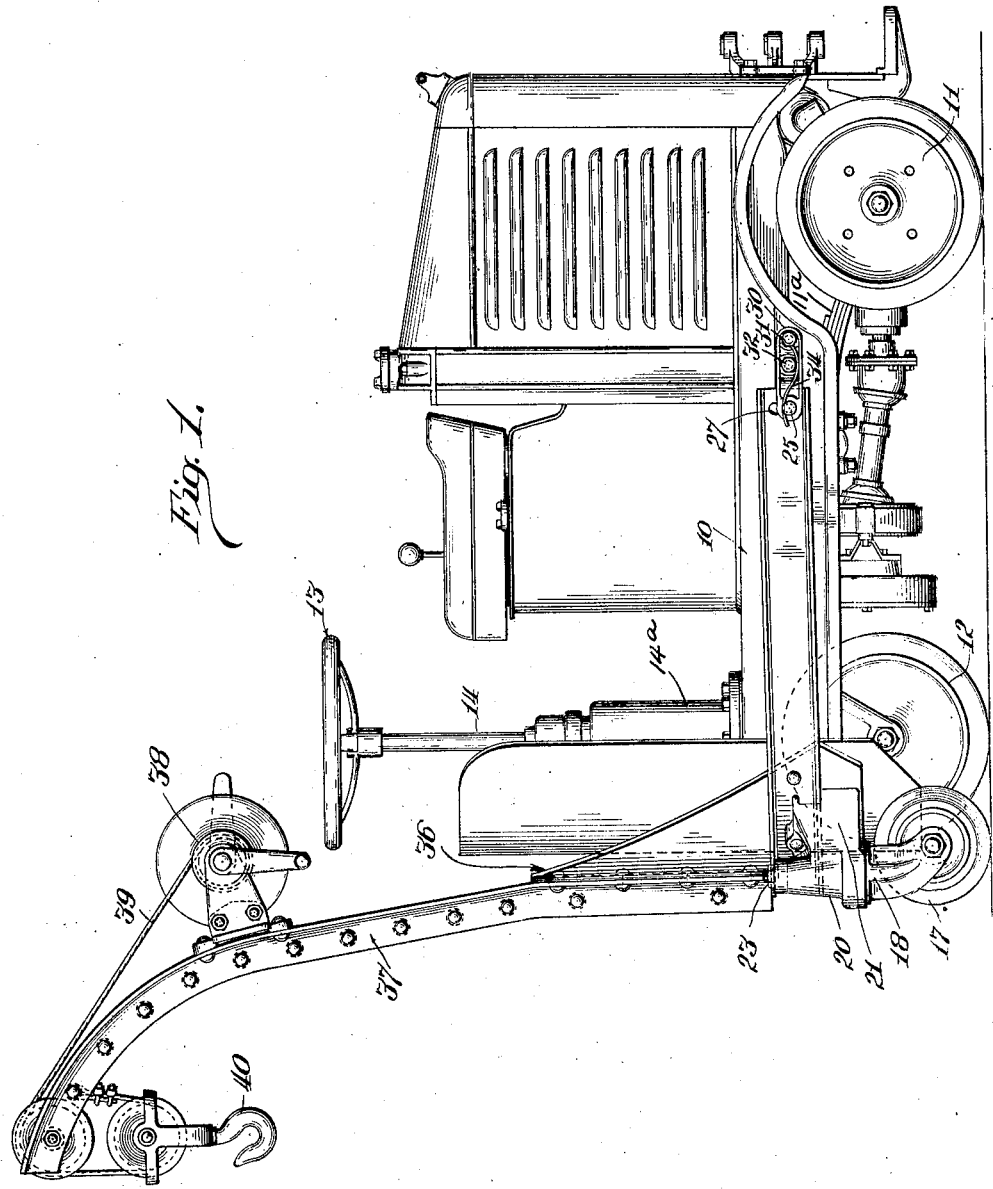

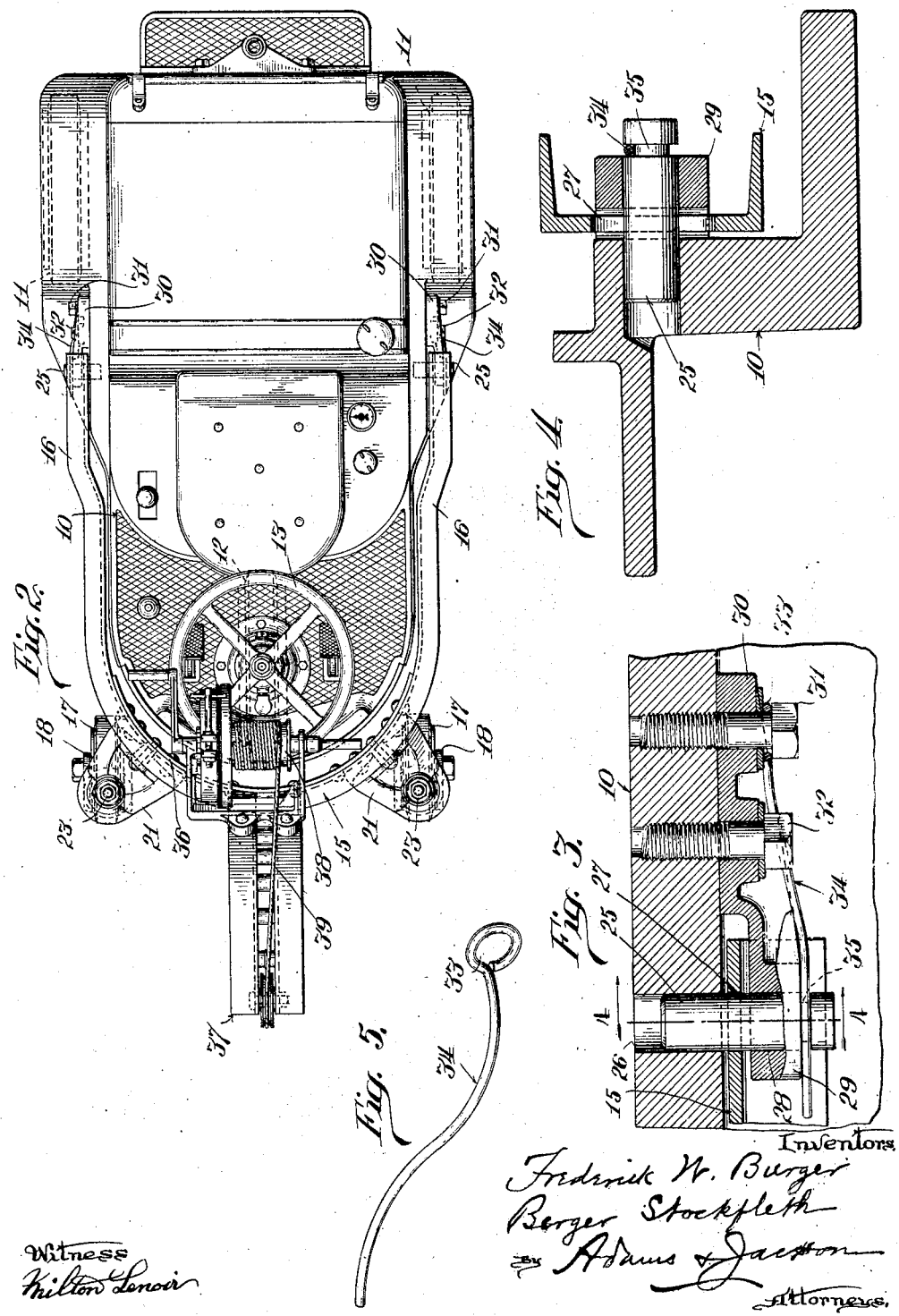

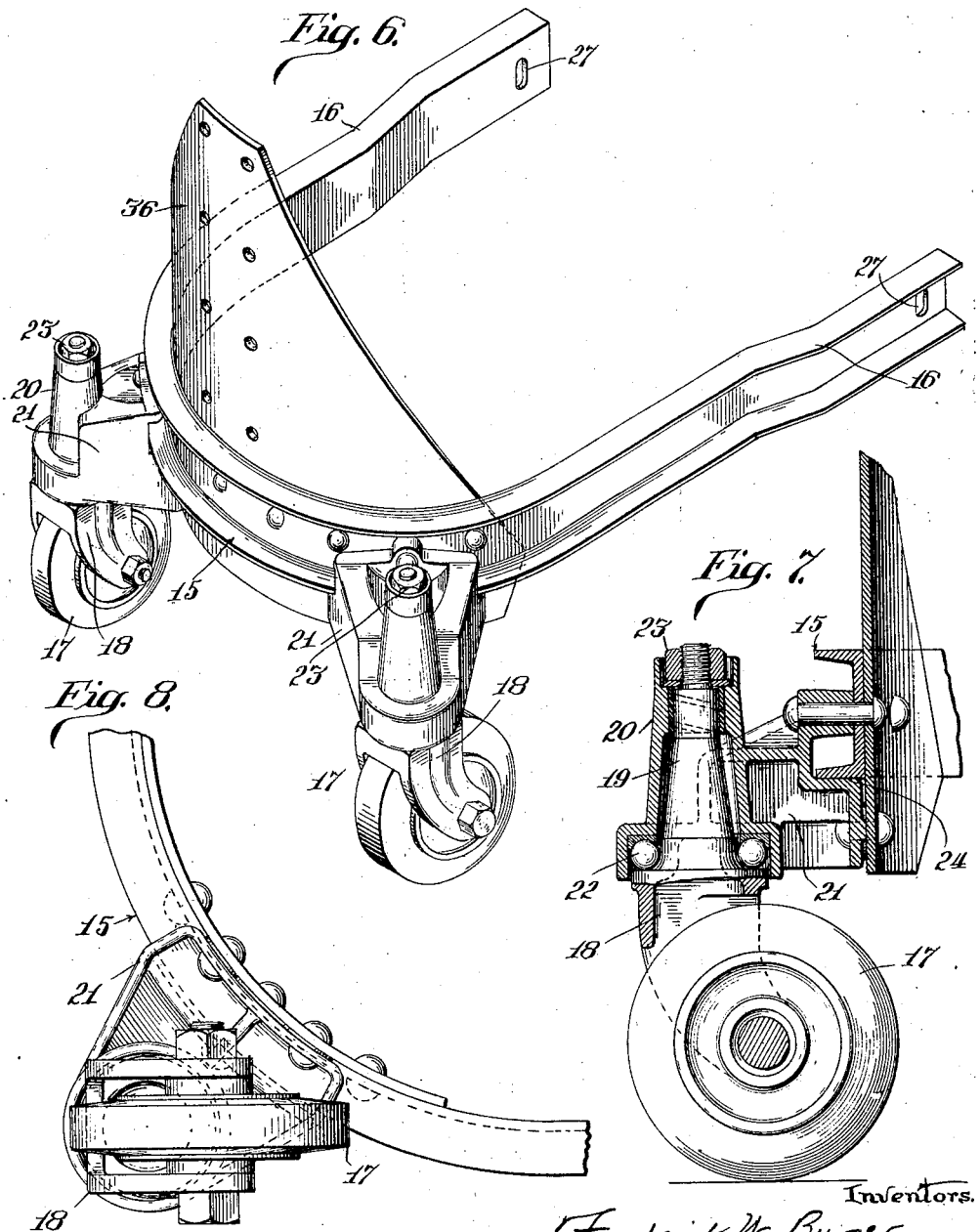

1,660,413

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCKTRACTOR COMPANY, OF BUCHANAN, MICHIGAN, A CORPORATION OF MICHIGAN.

LIFTING ATTACHMENT FOR SHOP TRACTORS.

Application filed December 31, 1923. Serial No. 683,719.

In connection with that type of motor vehicles generally known in the trade as shop tractors, and which are employed in and around shops and other places for pulling or pushing from place to place trucks for transporting various articles, it has been common to provide various devices for effecting a lifting or lowering of heavy articles that are to be moved from one location to another. Such lifting devices vary greatly in construction and arrangement to adapt them for the particular uses for which they are primarily designed or intended, and it is frequently found that such an apparatus while well adapted for use in connection with the elevating or lowering of one article or line of articles cannot be satisfactorily employed in connection with other articles that require to be handled by different means and in a different manner. Inasmuch as such elevating mechanisms have been formed as one of the relatively-fixed units of the tractor itself it has necessitated, in some situations where various kinds of elevating devices were required owing to the diverse character of the articles to be handled, that a number of such shop tractors be provided, which, of course, is a matter of very considerable expense.

It is the leading object of our invention to provide an attachment adapted to be readily attached to and detached from the supporting framework of an ordinary shop tractor, whereby such an attachment properly equipped with the required elevating means may, at any time and with great readiness, be substituted for another similar attachment that is equipped with some other character of elevating means, thus making it unnecessary to provide more than a single tractor for use in connection with the lifting and lowering of articles of such widely varying shapes and sizes as to require different styles of elevating apparatus to handle them. It is a further object of the invention to so arrange the attachment with reference to the supporting frame of the tractor that the supporting wheels that are provided at the forward portion of the attachment will sustain practically the full weight of the load being carried by the attachment, thereby relieving the steering wheel of such load, which will be counterbalanced by the weight of the engine and other parts that are mounted on the tractor frame. Another object is to provide improved means for so connecting the attachment as a whole with the tractor frame as to provide for a limited independent relative movement of the attachment and tractor and thereby compensate for shocks and joltings due to the wheeled supports of either passing over uneven surfaces. We accomplish these objects by the construction and arrangement of parts as shown in the drawings and hereinafter described. That which we believe to be new will be pointed out in the claims.

In the drawings,—

Fig. 1 is a view in side elevation of a shop tractor with which is operatively connected an attachment embodying our improvements, said attachment having shown as connected with it an ordinary crane;

Fig. 2 is a plan view of the mechanism shown in Fig. 1;

Fig. 3 is a detail being an enlarged view in horizontal section illustrating the manner of connecting the rear ends of the attachment to the main frame of the tractor;

Fig. 4 is a section taken at line 4—4 of Fig. 3;

Fig. 5 is a view of the resilient rod employed to hold in place one of the studs that the attachment is pivotally mounted upon;

Fig. 6 is a perspective view of the attachment that is adapted to have secured to it any desired form of lifting device;

Fig. 7 is an enlarged sectional detail illustrating one of the caster wheels that support the forward end of the attachment, and showing the manner of securing it in place; and Fig. 8 is a detail, being a plan view of one of the caster wheels as attached in place.

Referring to the several figures of the drawings,—10 indicates the main frame of a motor vehicle of the type employing an internal combustion engine as the motive power, and also of the type which is generally known as a shop tractor—such main frame being, as here shown, formed of a casting. Upon the frame is mounted a removable hood or casing which encloses the motor and other operating parts. The details of the tractor construction need not be entered into, as in and by themselves they form no part of the present invention, and indeed may vary widely in construction and arrangement. The tractor shown has two supporting wheels 11 at its rear end, the axle of which is driven from the engine as usual, and a single supporting and steering wheel 12 adjacent the front end and centrally disposed, which wheel 12 is controlled for hand purposes by means of a steering wheel 13 and a steering post 14 which may be operatively connected with said steering wheel in any usual manner. The frame 10 is preferably spring supported on these wheels 11 and 12, as by providing leaf springs 11ª between the driving axle of the wheels 11 and the frame.

The device with which the present invention is directly concerned comprises a yoke shaped member or frame which is indicated generally by the reference numeral 15, and which is preferably made of a single heavy piece of channel iron, the channeled side of which forms the outer face or side of the device. The two approximately-parallel arms of this yoke shaped member, indicated each by 16, are adapted to extend alongside of the side members of the tractor frame 10, and are attached to said frame at points considerably in rear of the dirigible wheeled support 12 of the tractor, the attaching means being preferably of a character later described herein. As best shown in Fig. 2, the bowed forward portion of the device 15 conforms substantially in shape to the forward end of the tractor frame, and is but a comparatively slight distance in advance of such frame.

At opposite sides of the longitudinal center of the yoke shaped member 15 are provided wheeled supports each in the form of a caster wheel 17 mounted between the arms of a yoke 18, from which rises a tapered standard 19 that is suitably journaled in the sleeve portion 20 of a bracket 21 that is riveted to the front face of the yoke shaped member 15. It is desirable also to provide anti-friction devices, such as indicated by 22, which will be located between the upper wall of the yoke 18 and an annular shoulder on the part 20. A nut 23 on the upper end of the standard 19 holds the caster wheel in place. As shown, (see Fig. 7) the bracket 21 is provided with a shoulder 24 upon which the lower flange of the channel member 15 rests. The two caster wheels furnish not only a strong support for the yoke shaped member 15 at its forward end, but, inasmuch as the member 15 when in operative position on a tractor, as shown in Figs. 1 and 2, lies comparatively close to the front end of the tractor as stated, such caster wheels will be quite closely positioned to the tractor frame, which is of advantage in that the addition of the attachment formed by the member 15 to the tractor does not add materially to the length of the apparatus as a whole, and hence can be operated in a shorter space than if such wheeled attachment projected to a considerable extent in advance of the tractor. Such arrangement also enables the tractor with the attachment connected thereto to be readily and quickly presented to the load that is to be imposed upon the member 15, as hereinafter stated.

Referring now to the manner of connecting the attachment 15 as a whole to the tractor frame, it will be seen that at each side of such frame and well toward the rear thereof there is provided a heavy stud 25 snugly but removably fitted in an opening 26 in the tractor frame. This stud passes through a short vertical slot 27 in the adjacent side member 16 of the yoke shaped frame, and also passes through and snugly fits in an opening 28 in an arm 29, such arm 29 forming part of a heavy bracket 30 that is bolted against the face of the tractor frame,—the arm 28 standing sufficiently away from the face of the tractor frame to allow the web of the side member 16 to enter between it and the tractor frame, as clearly shown in Figs. 3 and 4. The side members 16 are thus pivotally connected with the tractor frame. The bracket 30, in the construction shown, is secured to the tractor frame by two bolts 31 and 32, respectively. The bolt 31 is the rearmost one of the two, and it passes through an eye 33 of a heavy rod 34 of resilient material which, as clearly shown in Fig. 3, lies alongside of the bracket 30 and is bent to lie under the bolt 32 and then bent up and allowed to rest so as to press downwardly against the stud 25, such stud being grooved near its outer end as at 35, in which groove the spring rod 34 rests. These two spring rods 34 that are located respectively at opposite sides of the device will tend of course to keep their respective studs 25 in the lower parts of the slots 27, as indicated in Fig. 1, and will by their pressure on the studs prevent such studs from working loose and dropping out. The object of making the openings 27 in the form of slots rather than of holes corresponding closely to the shape of the studs is to prevent, to a certain extent, the vertical movement of the tractor, caused by the wheels thereof passing over a rough surface or an obstruction, from being communicated to the yoke shaped member 15. That this will be so will be evident, because if one of the wheels 11 rides over a small obstruction, the upward movement of the tractor frame that is caused thereby will not be transmitted to the adjacent side bar 16 so long as such upward movement is not greater than the length of the slot 27 into which the stud projects. In this regard, it will also be observed that by pivoting the arms 16 of the attachment frame to the tractor frame, the attachment frame will receive the benefit of the spring mounting of the tractor frame, so that shock cannot be transmitted to the pivotal ends of the arms 16 except through the spring suspension of the tractor frame. Moreover, by locating the pivotal point of attachment between the two frames intermediate the front and rear wheels of the tractor frame, as shown, only a portion of the vertical movement of either end of the tractor frame is transmitted to the pivoted ends of the arms 16.

At the forward end of the yoke shaped member 15 there is provided a curved plate 36 which constitutes not only a gusset for stiffening purposes, but also means for attaching any desired form of elevating mechanism. As shown, this gusset plate lies against the inner face of the member 15 and conforms in shape to the curved forward portion thereof, and is secured in place by numerous rivets, as best shown in Fig. 6, and as shown in that figure it will also preferably be provided with numerous rivet holes so that there may be attached to its outer face the desired elevating apparatus, the upper flange of the channel beam that forms the member 15 being well adapted to serve as a support for the lower end of an elevating apparatus to rest against, as, for example, the elevating apparatus shown in Fig. 1.

In Fig. 1 the elevating apparatus that is carried by the attachment or member 15 is an ordinary crane 37 that carries a hand operated windlass 38 upon which may be wound a cable 39 that runs through ordinary sheaves, from one of which is suspended a hook 40 adapted to engage with an article to be lifted and transported. It is to be understood, however, that our invention in its broader aspects is not confined to the use of the particular elevating apparatus here shown and briefly referred to, but that, on the contrary, it is contemplated that the member 15 may have attached to it any other of the well known forms of elevating devices, such as those known as tier lifts, finger lifts, truck lifts, scoops, and many others. Furthermore, it is to be understood that these various forms of elevating apparatus may be power operated, rather than operated by hand as in the case of the crane shown, the power therefor being derived either from the motor of the tractor or from a separate motor carried by the tractor.

With whatever form of elevating apparatus is employed, it will be evident that the load that is carried will be forward of the front end of the attachment or member 15, and that the effect is as that of a lever of the first class, whereby the caster wheels correspond to the fulcrum, and by reason of the two arms 16 extending well back of the forward wheeled support of the tractor, practically the entire weight of the tractor is made use of to counterbalance the weight of the load carried by the elevating mechanism. With the load so sustained and counterbalanced the tractor can move freely and it steers easily because the load is not imposed on the steering wheel. Moreover, owing to the close association of the member 15 with the frame of the tractor, the apparatus as a whole can be, as before stated, operated readily in comparatively close quarters.

What we claim as our invention and desire to secure by Letters Patent, is—

1. The combination with a shop tractor having end and side frame portions, of a yoke shaped attachment frame adapted to embrace the end of said tractor frame and comprising two spaced arms for extending back alongside the side portions of said tractor frame, means for releasably connecting said arms to the side portions of said tractor frame, a wheeled support for supporting the front end of said attachment frame, and means adjacent the front end of said attachment frame for the attachment of load hoisting mechanism.

2. A shop tractor attachment comprising in combination an approximately U-shaped frame adapted to lie opposite the sides and front of a tractor and be connected therewith, caster wheels for supporting the forward portion of said frame, and a plate secured to the forward portion of said frame and rising therefrom for the attachment thereto of load-sustaining mechanism.

3. A shop tractor attachment comprising a caster wheel supported frame adapted to be associated with one end of a tractor and having side members adapted to be attached to the tractor at opposite sides thereof, means for establishing a vertically flexible connection between said side members and the tractor, and load-hoisting means carried by said frame.

4. A shop tractor attachment comprising a wheel supported frame adapted to be associated with one end of a tractor and having side members extending in one direction from the wheel support of said frame, means for pivotally connecting said side members to the tractor at opposite sides thereof on a transverse, horizontal, pivotal axis, and load-hoisting means carried by said frame and extending outward therefrom at the opposite side of the wheel support thereof.

5. The combination with a shop tractor comprising front and rear wheels and a frame spring-supported thereon, of an attachment for said tractor comprising a yoke shaped frame adapted to embrace the end of said tractor frame and having substantially parallel spaced arms for extending back along the outer sides of said tractor frame, means for releasably pivoting said arms to the side portions of said tractor frame on a substantially horizontal axis disposed intermediate said front and rear wheels, said arms thereby receiving the spring support of said tractor frame, a caster wheel for the front end of said attachment frame, and load hoisting means carried by said attachment frame.

6. The combination with a shop tractor, of a frame comprising side bar members at each side of the tractor, the rear ends of said bars being located in rear of the front wheeled support of the tractor, means for connecting the rear end portion of each bar with the tractor, said means comprising a stud in one of said parts and a slot in the other part whereby a limited independent vertical movement of the tractor is permitted, a wheeled support for said frame adjacent its forward end, and load-sustaining means adjacent such forward end.

7. The combination with a shop tractor, of a wheeled frame comprising side bar members at each side of the tractor, the rear ends of said bars being located in rear of the front wheeled support of the tractor, a removable stud inserted in openings in each side bar and the adjacent side of the tractor, and resilient means for holding said stud in place.

8. The combination with a shop tractor, of a wheeled frame comprising side bar members at each side of the tractor, the rear ends of said bars being located in rear of the front wheeled support of the tractor, a removable stud inserted in openings in each side bar and the adjacent side of the tractor, and a spring rod connected with the side of the tractor and bearing against said stud to hold it in place.

9. In combination, a shop tractor comprising front and rear wheels and a spring-supported frame carried thereby, and an attachment for said tractor comprising a frame, wheel supported at its forward end, and having two arms for embracing the sides of said tractor, means for connecting said arms to said tractor frame, said arms thereby having a spring support through the spring-supported frame of said tractor, and load hoisting means carried by said attachment frame.

10. The combination with a shop tractor having dirigible and propelling wheels at opposite ends thereof, of a wheeled frame adapted to be associated with the tractor at the dirigible wheel end thereof, said frame comprising side members at each side of the tractor, means for establishing a vertically flexible pivotal connection between said side members and the tractor, and load hoisting means carried by said frame.

11. The combination with a shop tractor having dirigible and propelling wheels at opposite ends thereof, of a wheeled frame adapted to be associated with the tractor at the dirigible wheel end thereof, said frame comprising side members at each side of the tractor, means for pivotally connecting said side members to the tractor in a transverse, horizontal, pivotal axis, and load hoisting means carried by said frame and extending outward therefrom in the opposite direction from said side members.

12. In a shop tractor attachment, the combination of a frame comprising a section of channel bar circularly bowed intermediate its ends and having extending side portions to lie opposite the sides of the tractor and to be connected therewith, caster wheels for supporting the forward portion of said frame, and load hoisting means carried by said frame.

13. In a shop tractor attachment, the combination of a frame comprising a single section of channel bar bent to form a circularly curved portion, and two extending arm portions adapted to embrace the front and sides of a tractor, means for detachably connecting the arm portions of said channel bar to said tractor, caster wheels for supporting the forward portion of said frame, and load hoisting mechanism carried on said frame.

14. In a shop tractor attachment, the combination of a frame comprising a section of channel bar bent into U-shape with its flanges projecting outwardly, said frame being adapted to embrace the front and sides of a tractor, and being adapted to have the side portions thereof detachably connected to the tractor, supporting brackets secured to said channel bar adjacent the front portion thereof, caster wheels rotatably supported in said brackets, and load hoisting mechanism carried by said frame.

15. In combination, a shop tractor having a frame comprising a circularly curved front end, a single steering wheel located substantially centrally with respect to the width of said frame and swinging within the curve of said front end, a pair of driving wheels supporting the rear end of said tractor frame, and a load hoisting attachment adapted for detachable connection therewith comprising a yoke shaped frame having a circularly curved front end portion for closely embracing the curved front end of said tractor frame and having extending side arms adapted to extend along the side portions of said tractor frame, means for detachably connecting said side arms to the side portions of said tractor frame, a pair of caster wheel brackets secured to said attachment frame at points set back along the curved front end of said attachment frame, caster wheels swiveled in said brackets, and load hoisting mechanism carried by said attachment frame.

16. In combination, a shop tractor comprising a frame having a circularly curved front end, a single steering wheel located substantially centrally with respect to the width of said frame and swinging within the curve of said front end portion, a pair of driving wheels at the rear end of said frame, means for spring supporting said frame on said wheels, and a load hoisting attachment comprising a yoke shaped frame having a circularly curved front end portion for closely embracing the curved front end of said tractor frame and having extending side arms adapted to lie outside of the side portions of said tractor frame, means for detachably pivoting said arm portions to the side portions of said tractor frame on a substantially horizontal axis intermediate the front and rear wheels, a pair of caster wheel brackets secured to said attachment frame at points set back along the curved front end of said frame, caster wheels swiveled in said brackets, and load hoisting mechanism carried by said attachment frame.

17. The combination with a shop tractor, of a U-shaped attachment frame adapted to embrace the front and sides of said shop tractor, means for detachably connecting the side arm portions of said attachment frame to said tractor, wheel supporting means for the front portion of said attachment frame, an upwardly extending supporting member rising from the front of said attachment frame, and load hoisting mechanism comprising a sheave, a hoisting cable and a winding drum all mounted on said upwardly extending supporting member.

18. In combination, a shop tractor comprising a frame, a pair of driving wheels at the rear end of said frame, a single steering wheel at the front end of said frame located substantially centrally with respect to the width of said frame, a driver's compartment comprising a driver's seat at the front end of said frame, and a load hoisting attachment comprising a yoke shaped frame embracing the front end of said tractor frame and having side arm portions extending back along the outer sides of said tractor frame below said driver's compartment, and means for detachably connecting said side arm portions to said tractor frame.

FREDERICK W. BURGER.
BERGER STOCKFLETH.

CERTIFICATE OF CORRECTION.

Patent No. 1,660,413.  Granted February 28, 1928, to

FREDERICK W. BURGER ET AL.

It is hereby certified that the name of the assignee in the above numbered patent was erroneously written and printed as "Clark Trucktractor Company", whereas said name should have been written and printed as "Clark Tructractor Company", as shown by the records of assignments in this office; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.